(12) United States Patent
Centanni, Jr. et al.

(10) Patent No.: US 6,883,117 B2
(45) Date of Patent: Apr. 19, 2005

(54) BUS TRACE ANALYSIS A POSTERIORI

(75) Inventors: Jerome Anthony Centanni, Jr., Austin, TX (US); Mike Conrad Duron, Pflugerville, TX (US)

(73) Assignee: International Business Machines Corporation, Armonk, NY (US)

(*) Notice: Subject to any disclaimer, the term of this patent is extended or adjusted under 35 U.S.C. 154(b) by 524 days.

(21) Appl. No.: 09/998,387

(22) Filed: Nov. 15, 2001

(65) Prior Publication Data

US 2003/0093714 A1 May 15, 2003

(51) Int. Cl.$^7$ ............................................... G06F 11/00
(52) U.S. Cl. ................................... 714/37; 714/39
(58) Field of Search .............................. 714/37, 39, 43

(56) References Cited

U.S. PATENT DOCUMENTS

| | | | |
|---|---|---|---|
| 4,764,863 A | 8/1988 | Silverthorn, III et al. ... | 364/200 |
| 5,737,520 A | 4/1998 | Gronlund et al. ...... | 395/183.15 |
| 5,761,409 A | 6/1998 | Testardi ................... | 395/183.15 |
| 5,894,575 A | 4/1999 | Levine et al. ............... | 395/704 |
| 5,897,653 A | 4/1999 | Tashima ..................... | 711/106 |
| 5,933,594 A | 8/1999 | La Joie et al. .......... | 395/183.01 |
| 5,963,722 A | 10/1999 | Carter ......................... | 395/309 |
| 6,687,856 B1 * | 2/2004 | Jibbe .......................... | 714/37 |

FOREIGN PATENT DOCUMENTS

| | | | |
|---|---|---|---|
| JP | 4160657 | 6/1992 | ........... G06F/13/00 |
| JP | 4160658 | 6/1992 | ........... G06F/13/00 |
| JP | 8095945 A | 4/1996 | ........... G06F/15/78 |

OTHER PUBLICATIONS

Xie, H.A. et al., "An Sbus Multi Tracer and its Applications", http://ieeexplore.ieee.org/search97/s97is . . . %2Fa785309&ViewTemplate=printdocview.hts, Mar. 7, 2001, pp. 9–14.

Sandon et al., "Nstract: A Bus Driven Instruction Trace Tool for PowerPC Microprocessors", IBM Journal of Research and Development, vol. 41, No. 3, p. 331–4, Abstract.

* cited by examiner

*Primary Examiner*—Nadeem Iqbal
*Assistant Examiner*—Timothy M. Bonura
(74) *Attorney, Agent, or Firm*—Duke W. Yee; Mark E. McBurney; Cathrine K. Kinslow

(57) ABSTRACT

A method, computer program product, and data processing system for analyzing trace data containing bus transactions taking place in packets of varying length is disclosed. A dump of raw trace data from a logic analyzer is stored in a computer file. A computer program then analyzes the raw trace data to identify the locations of packets within the raw trace data. A packet type is determined for each packet, and data fields are extracted from the packet, according to the packet type. A summary of each packet containing the data fields and their contents is then presented to a user.

36 Claims, 4 Drawing Sheets

```
---------------- CYCLE: 2060254 ----------------
   COMMAND: LINK ACKNOWLEDGMENT
   REQUEST LINK SEQUENCE COUNT: 00
   PING: 0
   Rq B7: 0
   Rs B7: 0
   RESPONSE LINK SEQUENCE COUNT: 16
   SUSPEND: 0
   RESET: 0
   HEARTBEAT: 0
702 SPEED CHANGE: 0
   BYTE 0: A0
   BYTE 1: 00
   BYTE 2: 16
   BYTE 3: 00
   CRC BYTE 1: 46
   CRC BYTE 2: 77
   CRC BYTE 3: A0
   CRC BYTE 4: A6
```

FIG. 6

| BYTE NUMBER | | MOST SIGNIFICANT BYTE (602) | | | | | | | | LEAST SIGNIFICANT BYTE (604) | | | | | | | |
|---|---|---|---|---|---|---|---|---|---|---|---|---|---|---|---|---|---|
| CU | OPTIC | 0 | 1 | 2 | 3 | 4 | 5 | 6 | 7 | 0 | 1 | 2 | 3 | 4 | 5 | 6 | 7 |
| 1-2 | 1-2 | 001 (606) | | | LINK SEQUENCE COUNT | | | | | TRANSACTION ID | | | | | | | |
| 3-4 | 3-4 | DESTINATION ID | | | | | | | | | | | | | | | |
| 5-6 | 5-6 | SOURCE ID | | | | | | | | | | | | | | | |
| 7-8 | 7-8 | RESPONSE STATUS | | | | | | | | END-TO-END SEQUENCE COUNT | | | | | LENGTH | | |
| | 9-10 | SCRAMBLER KEY(0:15)[b] | | | | | | | | | | | | | | | |
| | 11-12 | SCRAMBLER KEY(16:31)[b] | | | | | | | | | | | | | | | |
| -- | -- | DATA | | | | | | | | | | | | | | | |
| 4n-4 | 4n-4 | DATA | | | | | | | | | | | | | | | |
| -- | -- | CRC(0:15) | | | | | | | | | | | | | | | |
| 4n | 4n | CRC(16:31) | | | | | | | | | | | | | | | |

601

600

BUS TRACE ANALYSIS A POSTERIORI

BACKGROUND OF THE INVENTION

1. Technical Field

The present invention is directed toward analyzing trace data from a logic analyzer. In particular the present invention is directed toward identifying and summarizing packets sent over a bus system.

2. Description of Related Art

Computer system design, initialization and integration activities often can include probing and collecting of bus trace data. Raw bus trace data is difficult to analyze when in numeric or signal form. In particular, when activity on a bus system involves the exchange of variable-length packets, the raw trace data is particularly difficult to decipher.

Logic analyzers are frequently used to acquire bus trace data. Logic analyzers may also be programmed to perform some analysis of the raw data, but this capability is often limited, both in the complexity of transactions to be analyzed and in the bus speeds for which real-time analysis is possible.

It would be advantageous, therefore, to be able to analyze bus transactions of arbitrary length and complexity using trace data acquired at any speed at which raw trace data may be acquired.

SUMMARY OF THE INVENTION

The present invention provides a method, computer program product, and data processing system for analyzing trace data containing bus transactions taking place in packets of varying length. A dump of raw trace data from a logic analyzer is stored in a computer file. A computer program then analyzes the raw trace data to identify the locations of packets within the raw trace data. A packet type is determined for each packet, and data fields are extracted from the packet, according to the packet type. A summary of each packet containing the data fields and their contents is then presented to a user.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a diagram depicting a typical packet monitored for in a preferred embodiment of the present invention;

FIG. 7 is a diagram depicting a typical summary output by a preferred embodiment of the present invention;

DETAILED DESCRIPTION OF THE PREFERRED EMBODIMENT

Figure 1:
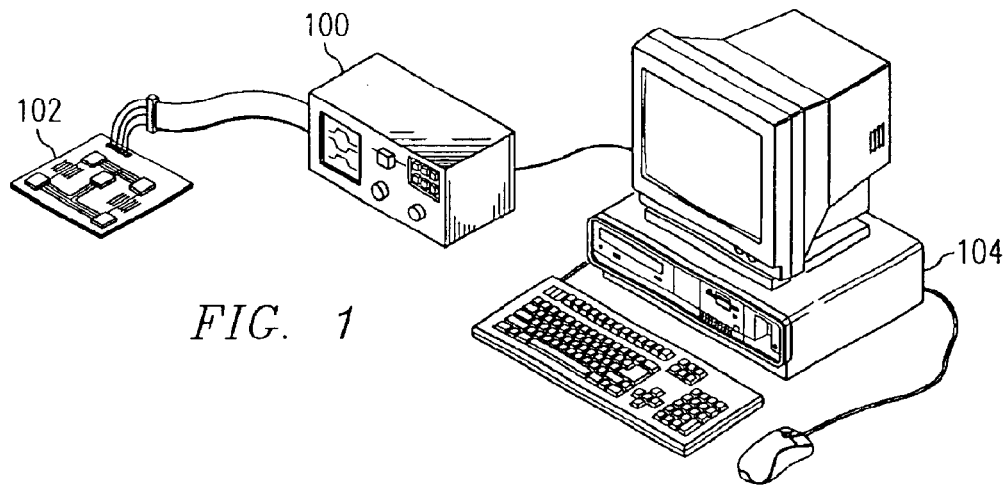
FIG. 1 is a diagram containing an overall view of the hardware used in a preferred embodiment of the present invention.

FIG. 1 is a diagram providing an overall view of the hardware involved in a preferred embodiment of the present invention. A logic analyzer 100 reads signals from a bus system on a circuit board 102 to create a sequence of bit vectors. A bit vector is an ordered set of bits representing the state of a set of signals within a digital circuit at a particular point in time. The bit vectors obtained by logic analyzer 100 are transmitted to computer workstation 104.

Computer workstation 104 first stores the bit vectors in a file. Computer workstation 104 then executes an analysis program to interpret the bit vectors. Bit vectors are simply raw binary data. In a preferred embodiment of the present invention, however, the raw bit vectors represent packets of information in a bus system. Computer workstation 104 identifies where in the sequence of bit vectors these packets begin and end. Computer workstation 104 then identifies where certain fields of data exist within each of the packets and reports these data fields to a user.

Figure 2:
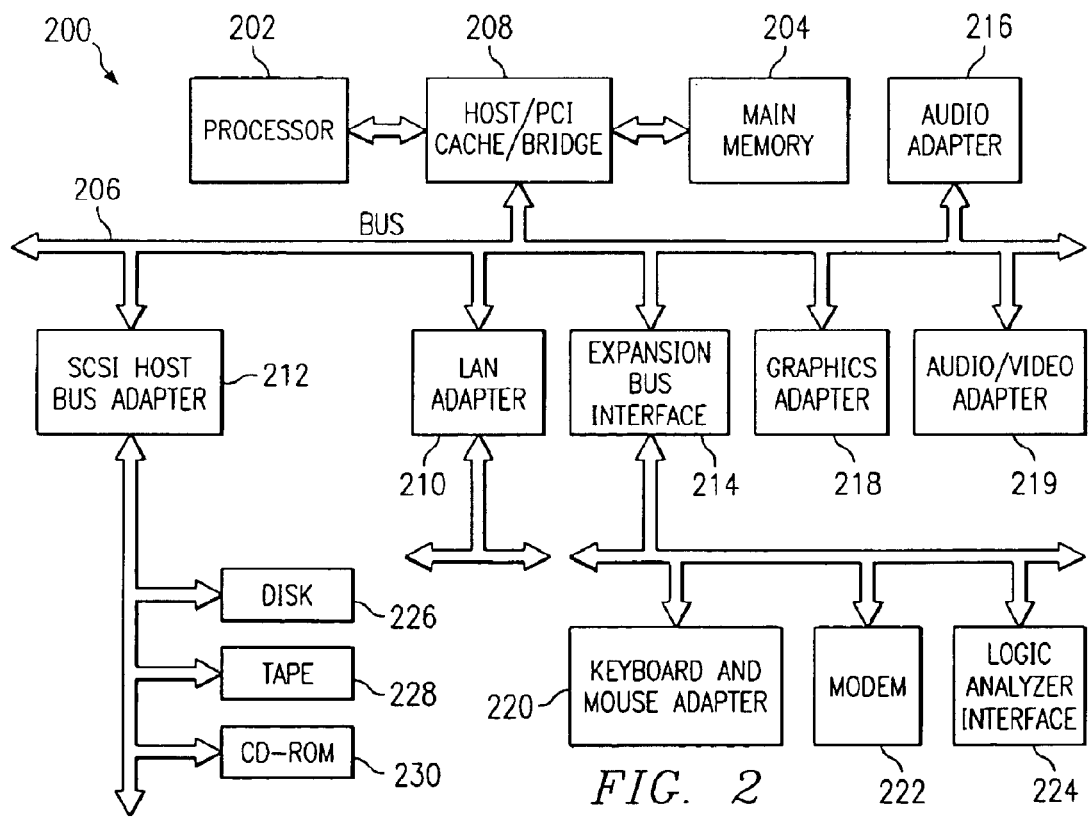
FIG. 2 is a block diagram of a data processing system in which the processes of the present invention may be implemented.

With reference now to FIG. 2, a block diagram of a data processing system is shown in which the present invention may be implemented. Data processing system 200 is an example of a computer, such as computer workstation 104 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and logic analyzer interface 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system. For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204 or in one or more peripheral devices 226–230.

Logic analyzer interface 224 provides a connection to a logic analyzer, such as logic analyzer 100 in FIG. 1. Computer 200 can download bit vectors or other analyzer trace data from the logic analyzer to be stored in memory 204 or hard disk drive 226, for instance. In a preferred embodiment of the present invention, computer 200 downloads bit vectors to a file on hard disk drive 226, then executes an analysis program to analyze the bit vector data a posteriori.

Figure 3:
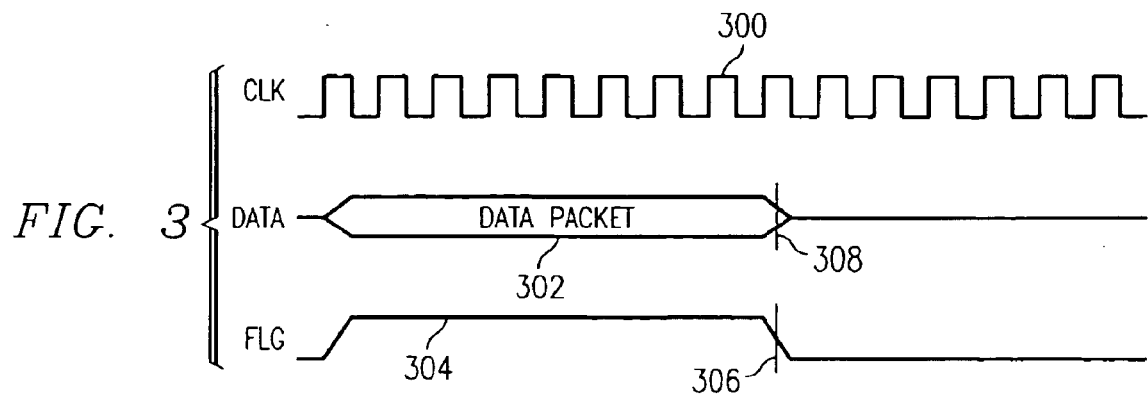
FIG. 3 is a timing diagram describing a process of transmitting a packet over a bus system under test by a preferred embodiment of the present invention.

FIG. 3 is a timing diagram depicting the transmission of a packet over a bus system in a circuit board under test in a preferred embodiment of the present invention. The bus system signals comprise a clock signal 300, a plurality of data lines 302, and a flag signal 304. Clock signal 300 times the transmission of data across the bus system. Data lines 302 carry binary data in parallel over the bus system. Typically, data lines 302 will comprise eight, sixteen, or thirty-two data lines representing eight, sixteen, or thirty-two bits of data transmitted across the bus system at any one time. Flag signal 304 signals the beginning and ending of packets over the bus. Typically, flag signal 304 will be at high level (logic 1) while the data packet is being transmitted, and will return to low level (logic 0) (306) a few clock cycles before the data packet transmission ends (308).

Figure 4A:
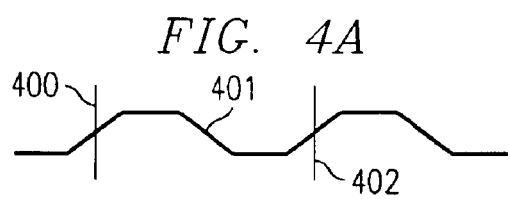
FIGS. 4A and 4B are timing diagrams depicting clock signals used to trigger a logic analyzer in accordance with a preferred embodiment of the present invention.
Figure 4B:
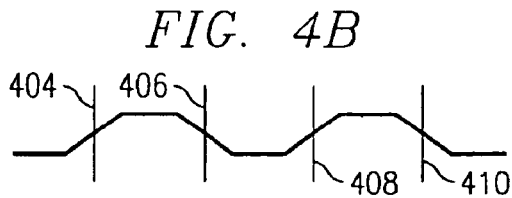

FIGS. 4A and 4B are diagrams depicting a clock signal used for triggering logic analyzer 100. Logic analyzer 100 reads a series of bit vectors from circuit board 102 over time. Timing signal 401 (FIG. 4A), which corresponds with clock signal 400 in FIG. 4, triggers the acquisition of bit vector values from circuit board 102. FIG. 4A depicts a mode of operation of logic analyzer 100 in which bit vectors are read at each rising edge (400, 402) of clock signal 401. FIG. 4B depicts a mode in which bit vectors are read on each rising edge and falling edge (404, 406, 408, 410). In the preferred embodiment herein described, it is necessary to read bit vectors at both rising and falling edges of the clock signal.

With many logic analyzers, however, operation at higher speeds (i.e., higher clock speeds or triggering on both edges of the clock signal) means that the functionality of the logic analyzer becomes reduced. An analyzer that might be able to detect patterns in the bit vectors at 250 MHz, may not be able to detect such patterns at 500 MHz, for instance. This is at least part of the motivation for the present invention. The present invention allows for a posteriori analysis of trace data, which can be performed regardless of what speeds of operation the logic analyzer is capable of operating at.

Figure 5:
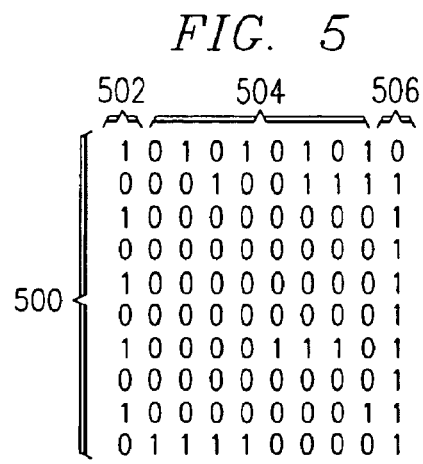
FIG. 5 is a diagram depicting the bit vectors generated by a logic analyzer and transmitted to a computer workstation in a preferred embodiment of the present invention.

FIG. 5 is a diagram depicting the bit vectors generated by logic analyzer 100 and transmitted to computer workstation 104 in a preferred embodiment of the present invention. Bit vectors 500 are downloaded to computer workstation 104 and preferably stored in a text file wherein each line of the text file represents a single bit vector. FIG. 5 depicts a text file in accordance with the bus system signals shown in FIG. 3.

Thus, the first bit of each vector (502) represents a clock signal. One can see that the value of clock bit 502 changes with each vector, since logic analyzer 100 is configured to trigger the reading of a bit vector on both edges of clock signal 300. The middle eight bits (504) represent bytes of data. Finally, the last bit of each vector (506) represents the state of flag signal 304. The beginning and end of a packet are identified using flag bit 506. A transition in flag bit 506 from zero to one denotes the beginning of a packet, and the end of a packet is signified by transitioning flag bit 506 back to zero a few bytes before the end of the packet. How many bytes before the end of the packet the transition occurs at depends on the length of the packet in a preferred embodiment of the present invention. This is described in more detail in FIG. 9.

FIG. 6 is a diagram depicting a typical packet 600 in a preferred embodiment of the present invention. Packet 600 is made up of a series of 16-bit words 601, which are themselves decomposed into two 8-bit bytes 602 and 604, for transmission over an 8-bit bus system. Each of words 601 is divided into data fields, such as packet type data field 606. Each different type of packet will contain different fields, and different packets may have different lengths. The length of the packet, as was stated earlier, is determined by a flag signal. Packet type data field 606 denotes the packet type, which identifies the particular set of data fields present within packet 600.

Analysis software executed by computer workstation 104 (FIG. 1) takes the raw bit vector data shown in FIG. 5, identifies the presence of packets within the data, identifies the fields within each packet, and finally outputs a summary of the packet contents for a user. FIG. 7 is a diagram depicting a typical summary output by a preferred embodiment of the present invention. Cycle line 700 provides an identifier number for identifying the packet being described. Lines 702 list various fields of the packet and their contents.

Figure 8:
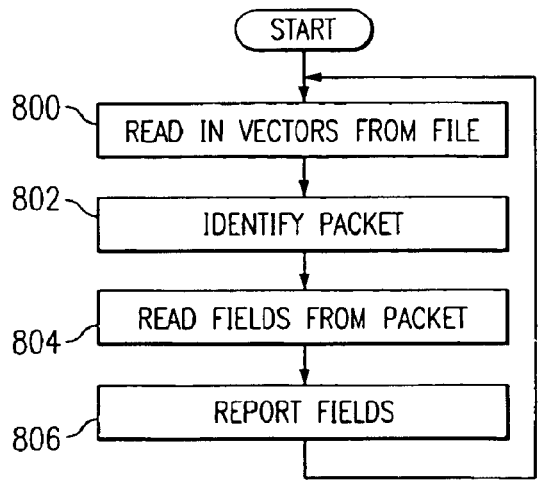
FIG. 8 is a flowchart representation of a basic process of a posteriori analyzing trace data in accordance with a preferred embodiment of the present invention.

FIG. 8 is a flowchart representation of the basic process of a posteriori analyzing trace data in accordance with a preferred embodiment of the present invention. Bit vectors of trace data are read in from a file (step 800). A packet is identified within the trace data (step 802). Data fields are extracted from the packet data (step 804). Finally, the fields are reported to a user (step 806), before the process cycles again to step 800 to read additional vectors from the file.

Figure 9:
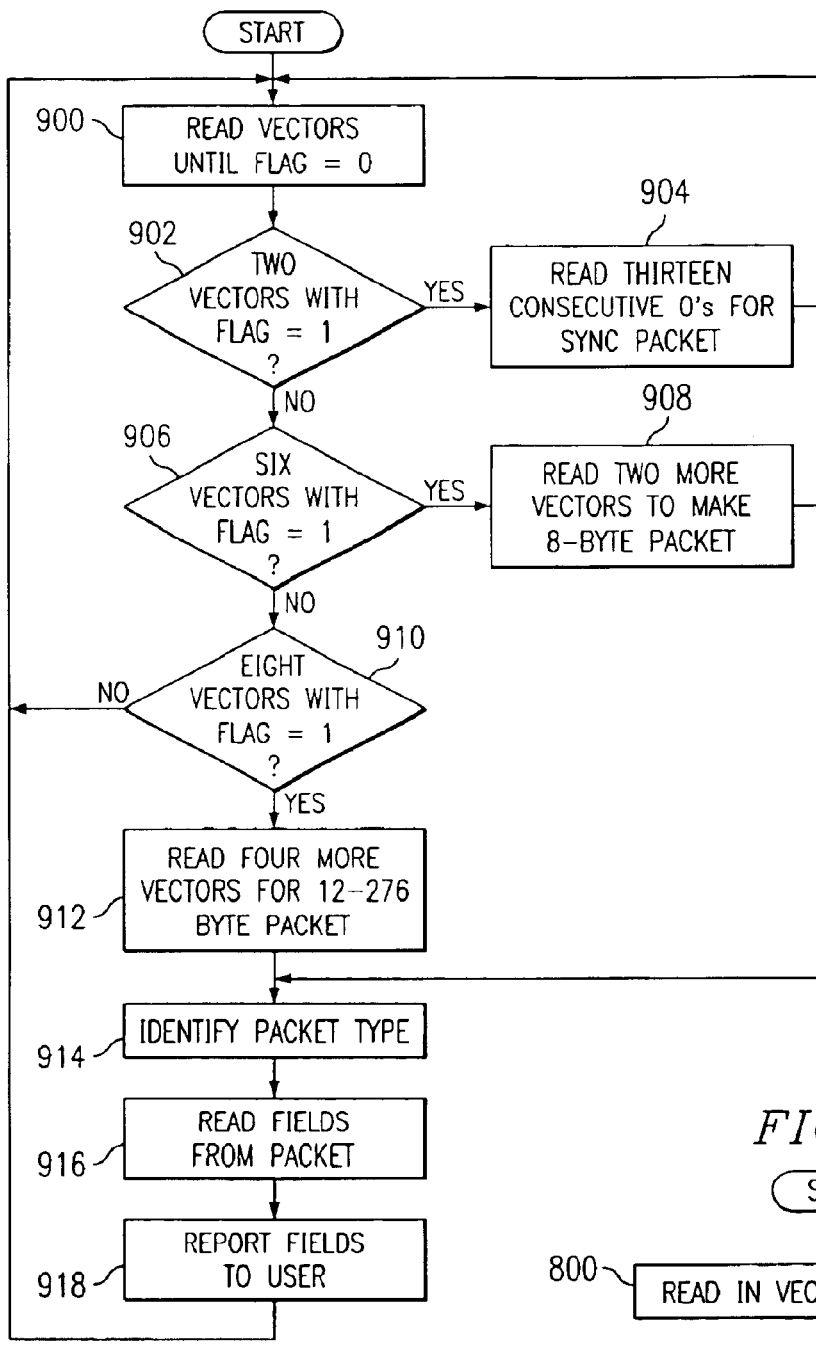
FIG. 9 is a more detailed flowchart representation of a process of analyzing trace data in accordance with a preferred embodiment of the present invention.

FIG. 9 is a more detailed flowchart representation of the process of analyzing trace data in accordance with a preferred embodiment of the present invention. The process shown in FIG. 9 is specific to a particular bus standard utilizing packets of varying length, but one of ordinary skill in the art will appreciate that different packet-sizing schemes may be utilized than the one here depicted, while still staying within the scope and spirit of the invention as claimed.

Vectors of trace data (representing bytes transferred across the bus system under test) are read in while the flag bit is set to one, until the flag bit is transitioned to zero (step 900). If two vectors with flag bit set to one were reads (step 902:Yes), then a "sync" packet for synchronizing bus peripherals and processor(s) has been encountered, and a the next contiguous block of thirteen zero bytes should be read in as the sync packet before proceeding (step 904). The process then cycles to step 900 to read additional vectors.

If six vectors have been read with flag bit set to one (step 906:Yes), two more vectors must be read to complete an eight-byte packet (step 908). If more than eight vectors have been read (step 910:Yes), then four more vectors are read (step 912) to make a 12-276 byte packet (step 912). Otherwise (step 910:No), the process cycles to step 900 to read additional vectors.

Once a packet has been read in, the packet's type is identified (step 914). Then, the specific fields corresponding to that particular type of packet are read in from the packet (step 916). Finally, the fields and their contents are reported to a user (step 918) and the process cycles back to step 900 to read additional vectors.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For instance, in one embodiment, packets may be read into memory one at a time to save memory space. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method comprising:
    reading a plurality of trace vectors from a file on a storage device;
    identifying a subset of trace vectors from the plurality of trace vectors to form a packet, wherein the packet is variable in length;
    identifying a plurality of data fields within the packet based on a packet type; and
    presenting each of the data fields as output to a user.

2. The method of claim 1, wherein reading the plurality of trace vectors includes reading the subset of trace vectors into memory.

3. The method of claim 2, further comprising:
    reading a second subset of trace vectors into the memory, wherein the second subset of the trace vectors forms a second packet.

4. The method of claim 1, wherein the storage device is one of an optical disk, a magnetic disk, and a memory within a computer.

5. The method of claim 1, wherein each of the plurality of trace vectors includes a clock bit, a plurality of data bits, and a flag bit.

6. The method of claim 5, wherein wherein the flag bit indicates one of a beginning of the packet when the flag bit is transitioned from zero to one, and an end of the packet when the flag bit is transitioned from one to zero.

7. The method of claim 1, further comprising:
    reading the plurality of trace vectors from an item of test equipment; and
    storing the plurality of trace vectors in the file.

8. The method of claim 7, wherein the item of test equipment is a logic analyzer.

9. The method of claim 8, wherein the logic analyzer is connected to a bus system.

10. The method of claim 7, wherein the item of test equipment reads the plurality of trace vectors in synchronization with a clock signal.

11. The method of claim 10, wherein the plurality of trace vectors are read in synchronization with rising edges and falling edges of the clock signal.

12. The method of claim 6, wherein identifying the subset of trace vectors includes monitoring the flag bit to determine if the flag bit is transitioned from one of zero to one, and one to zero.

13. A computer program product in a computer readable medium, comprising instructions for:
    reading a plurality of trace vectors from a file on a storage device;
    identifying a subset of trace vectors from the plurality of trace vectors to form a packet, wherein the packet is variable in length;
    identifying a plurality of data fields within the packet based on a packet type; and
    presenting each of the data fields as output to a user.

14. The computer program product of claim 13, wherein reading the plurality of trace vectors includes reading the subset of trace vectors into memory.

15. The computer program product of claim 14, comprising additional instructions for:
    reading a second subset of the trace vectors into the memory, wherein the second subset of trace vectors forms a second packet.

16. The computer program product of claim 13, wherein the storage device is one of an optical disk, a magnetic disk, and a memory within a computer.

17. The computer program product of claim 13, wherein each of the plurality of trace vectors includes a clock bit, a plurality of data bits, and a flag bit.

18. The computer program product of claim 17, wherein the flag bit indicates one of a beginning of the packet when the flag bit is transitioned from zero to one, and an end of the packet when the flag bit is transitioned from one to zero.

19. The computer program product of claim 13, comprising additional instructions for:
reading the plurality of trace vectors from an item of test equipment; and
storing the plurality of trace vectors in the file.

20. The computer program product of claim 19, wherein the item of test equipment is a logic analyzer.

21. The computer program product of claim 20, wherein the logic analyzer is connected to a bus system.

22. The computer program product of claim 19, wherein the item of test equipment reads the plurality of trace vectors in synchronization with a clock signal.

23. The computer program product of claim 22, wherein the plurality of trace vectors are read in synchronization with rising edges and falling edges of the clock signal.

24. The computer program product of claim 18, wherein identifying the subset of trace vectors includes monitoring the flag bit to determine if the flag bit is transitioned from one of zero to one, and one to zero.

25. A data processing system comprising:
a bus system;
a processing unit connected to the bus system and including at least one processor;
memory connected to the bus system;
a set of instructions stored in the memory,
wherein the processing unit executes the set of instructions to perform the acts of:
reading a plurality of trace vectors from a file on a storage device;
identifying a subset of trace vectors from the plurality of trace vectors to form a packet, wherein the packet is variable in length;
identifying a plurality of data fields within the packet based on a packet type; and
presenting each of the data fields as output to a user.

26. The data processing system of claim 25, wherein reading the plurality of trace vectors includes reading the subset of trace vectors into the memory.

27. The data processing system of claim 26, wherein the processing unit executes the set of instructions to perform the additional acts of:
reading a second subset of trace vectors into the memory, wherein the second subset of trace vectors forms a second packet.

28. The data processing system of claim 25, wherein the storage device is one of an optical disk, a magnetic disk, and a memory within a computer.

29. The data processing system of claim 25, wherein each of the plurality of trace vectors includes a clock bit, a plurality of data bits, and a flag bit.

30. The data processing system of claim 29, wherein the flag bit indicates one of a beginning of the packet when the flag bit is transitioned from zero to one, and an end of the packet when the flag bit is transitioned from one to zero.

31. The data processing system of claim 25, wherein the processing unit executes the set of instructions to perform the additional acts of:
reading the plurality of trace vectors from an item of test equipment; and
storing the plurality of trace vectors in the file.

32. The data processing system of claim 31, wherein the item of test equipment is a logic analyzer.

33. The data processing system of claim 32, wherein the logic analyzer is connected to a bus system.

34. The data processing system of claim 31, wherein the item of test equipment reads the plurality of trace vectors in synchronization with a clock signal.

35. The data processing system of claim 34, wherein the plurality of trace vectors are read in synchronization with rising edges and falling edges of the clock signal.

36. The data processing system of claim 30, wherein identifying the subset of trace vectors includes monitoring the flag bit to determine if the flag bit is transitioned from one of zero to one, and one to zero.

* * * * *